(12) United States Patent
Eros

(10) Patent No.: US 7,017,921 B2
(45) Date of Patent: Mar. 28, 2006

(54) STROLLER WITH RETAINING MECHANISM

(75) Inventor: Peter F. Eros, Vandalia, OH (US)

(73) Assignee: Evenflo Company, Inc., Vandalia, OH (US)

(*) Notice: Subject to any disclaimer, the term of this patent is extended or adjusted under 35 U.S.C. 154(b) by 0 days.

(21) Appl. No.: 10/298,319

(22) Filed: Nov. 18, 2002

(65) Prior Publication Data
US 2004/0094922 A1   May 20, 2004

(51) Int. Cl.
B62B 7/14        (2006.01)

(52) U.S. Cl. .............................. 280/47.38; 297/256.16

(58) Field of Classification Search ............ 280/47.38, 280/47.25, 47.39, 658, 657, 650, 647, 642, 280/643, 47.41; 297/130, 256.16
See application file for complete search history.

(56) References Cited

U.S. PATENT DOCUMENTS

| | | | |
|---|---|---|---|
| 4,861,105 A * | 8/1989 | Merten et al. ................. 280/30 |
| 4,915,401 A | 4/1990 | Severson et al. | |
| 5,201,535 A * | 4/1993 | Kato et al. .................... 280/30 |
| 5,203,577 A * | 4/1993 | Kato et al. .................... 280/30 |
| 5,246,272 A * | 9/1993 | Kato et al. ................... 297/364 |
| 5,385,386 A | 1/1995 | Beamish et al. | |
| 5,540,365 A | 7/1996 | LaMair | |
| 5,567,008 A * | 10/1996 | Cone, II ....................... 280/30 |
| 5,676,386 A * | 10/1997 | Huang ......................... 280/30 |
| 5,772,279 A | 6/1998 | Johnson, Jr. | |
| 5,865,447 A * | 2/1999 | Huang ......................... 280/30 |
| 5,947,555 A * | 9/1999 | Welsh et al. ................ 297/130 |
| 5,988,670 A * | 11/1999 | Song et al. ................... 280/30 |
| D421,940 S | 3/2000 | Gibson et al. | |
| 6,070,890 A * | 6/2000 | Haut et al. ............... 280/47.38 |
| 6,189,914 B1 | 2/2001 | Worth et al. | |
| 6,286,844 B1 * | 9/2001 | Cone et al. .............. 280/47.41 |
| 6,318,807 B1 * | 11/2001 | Perego ......................... 280/30 |
| 6,331,032 B1 | 12/2001 | Haut et al. | |
| 6,374,775 B1 | 4/2002 | Baumsteiger | |
| 6,409,205 B1 * | 6/2002 | Bapst et al. ................ 280/642 |
| 6,446,990 B1 | 9/2002 | Nania et al. | |
| 6,478,327 B1 * | 11/2002 | Hartenstine et al. ........ 280/642 |
| 6,595,583 B1 * | 7/2003 | Hou ............................. 280/30 |
| 6,695,400 B1 * | 2/2004 | Washizuka et al. ......... 297/130 |
| 6,783,135 B1 * | 8/2004 | Nord ............................ 280/30 |

OTHER PUBLICATIONS

Stroller Owner's Manual, by Graco (2000).
LiteRiders Owner's Manual by Graco (Jul. 2002).
Infant Restraint/Carrier Owner's Manual by Graco (Sep. 2002).

* cited by examiner

*Primary Examiner*—Jeff Restifo
(74) *Attorney, Agent, or Firm*—Taft, Stettinius & Hollister, LLP

(57) ABSTRACT

A stroller including a frame shaped to removably receive an infant carrier thereon, a set of wheels coupled to the frame, and a handlebar shaped and located to be gripped by an operator such that the operator can roll the stroller in the desired direction. The stroller further includes a retaining mechanism that is movable between a retaining position and a loading position. The retaining mechanism is configured such that locating the infant carrier on the frame or lifting the infant carrier off of the frame causes the retaining mechanism to move from one of the retaining or loading positions to the other of said retaining or loading positions.

14 Claims, 6 Drawing Sheets

STROLLER WITH RETAINING MECHANISM

The present invention is directed to a stroller for receiving an infant carrier, and more particularly to a stroller including a retaining mechanism for retaining the infant carrier on the stroller.

BACKGROUND

Travel systems are often used to support and transport infants, children, toddlers and juveniles. Such travel systems can include an infant carrier that is shaped and configured to securely receive an infant therein or thereon. The travel system may also include a stroller, car seat base, or various other components which are shaped to releasably or removably receive the infant carrier thereon. The infant carrier and/or infant carrier-receiving component may include various latches or locking mechanisms to secure the infant carrier to the infant carrier-receiving component.

When the infant-receiving component is a stroller, many existing travel systems secure the infant carrier only to the tray of the stroller. Some existing travel systems may include a retaining mechanism which may require operation by an adult to move the retaining mechanism between its locked and unlocked positions. Accordingly there is a need for an infant carrier-receiving component with a retaining mechanism that can secure an infant carrier to an infant carrier-receiving component that is easy to use and operate.

SUMMARY

In one embodiment, the invention is a component shaped to receive an infant carrier thereon which includes a locking mechanism that secures the infant carrier to the component without requiring any operation by the user, and/or that allows the infant carrier to be uncoupled from the component without requiring any operation by the user.

In one embodiment, the invention is a stroller including a frame shaped to removably receive an infant carrier thereon, a set of wheels coupled to the frame, and a handlebar shaped and located to be gripped by an operator such that the operator can roll the stroller in the desired direction. The stroller further includes a retaining mechanism that is movable between a retaining position and a loading position. The retaining mechanism is configured such that locating the infant carrier on the frame or lifting the infant carrier off of the frame causes the retaining mechanism to move from one of the retaining or loading positions to the other of said retaining or loading positions.

Other objects and advantages of the present invention will be apparent from the following description and the accompanying drawings.

DETAILED DESCRIPTION

Figure 1:
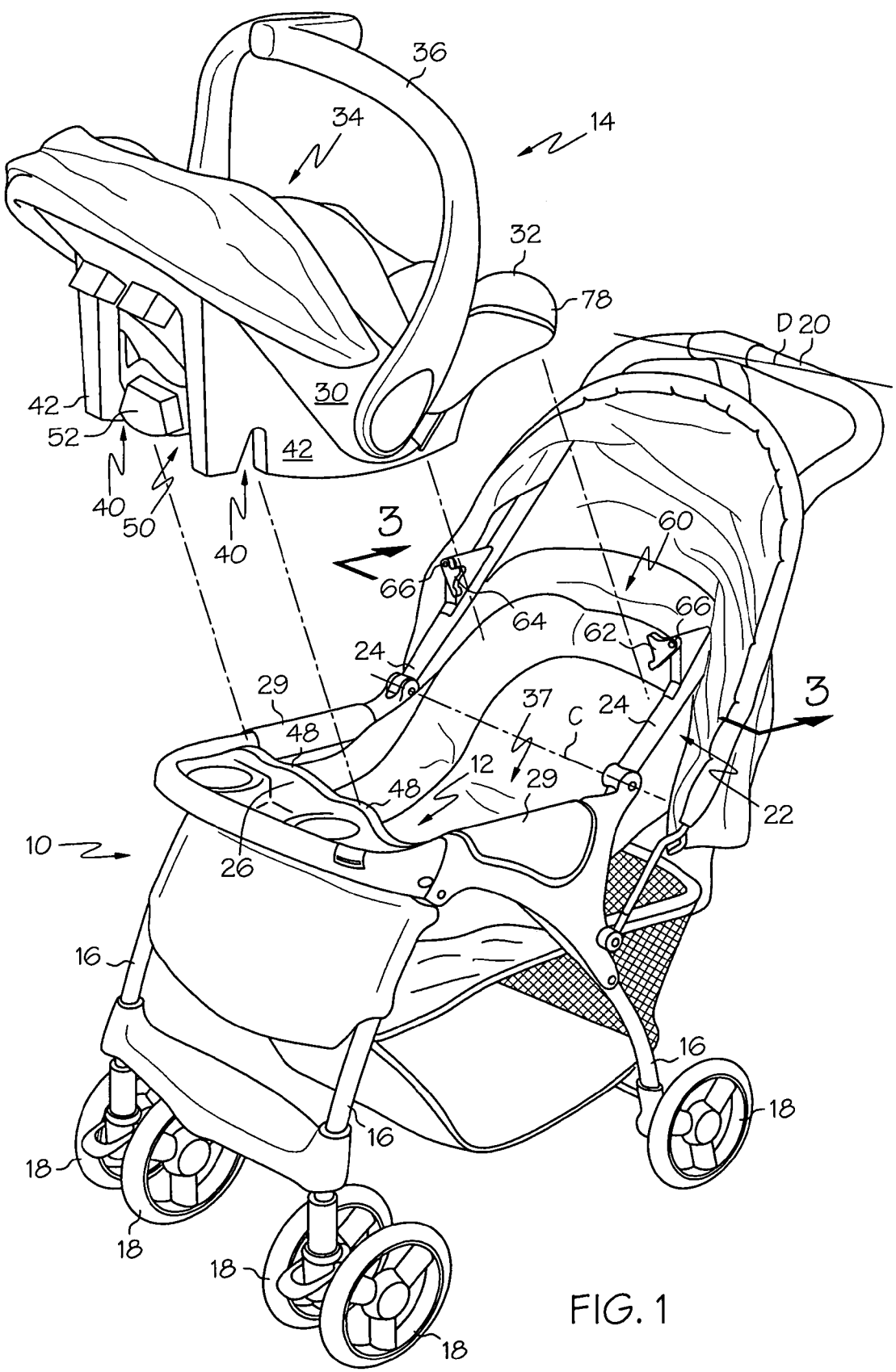
FIG. 1 is a front perspective view of a stroller and an infant carrier spaced apart from the stroller.
Figure 2:
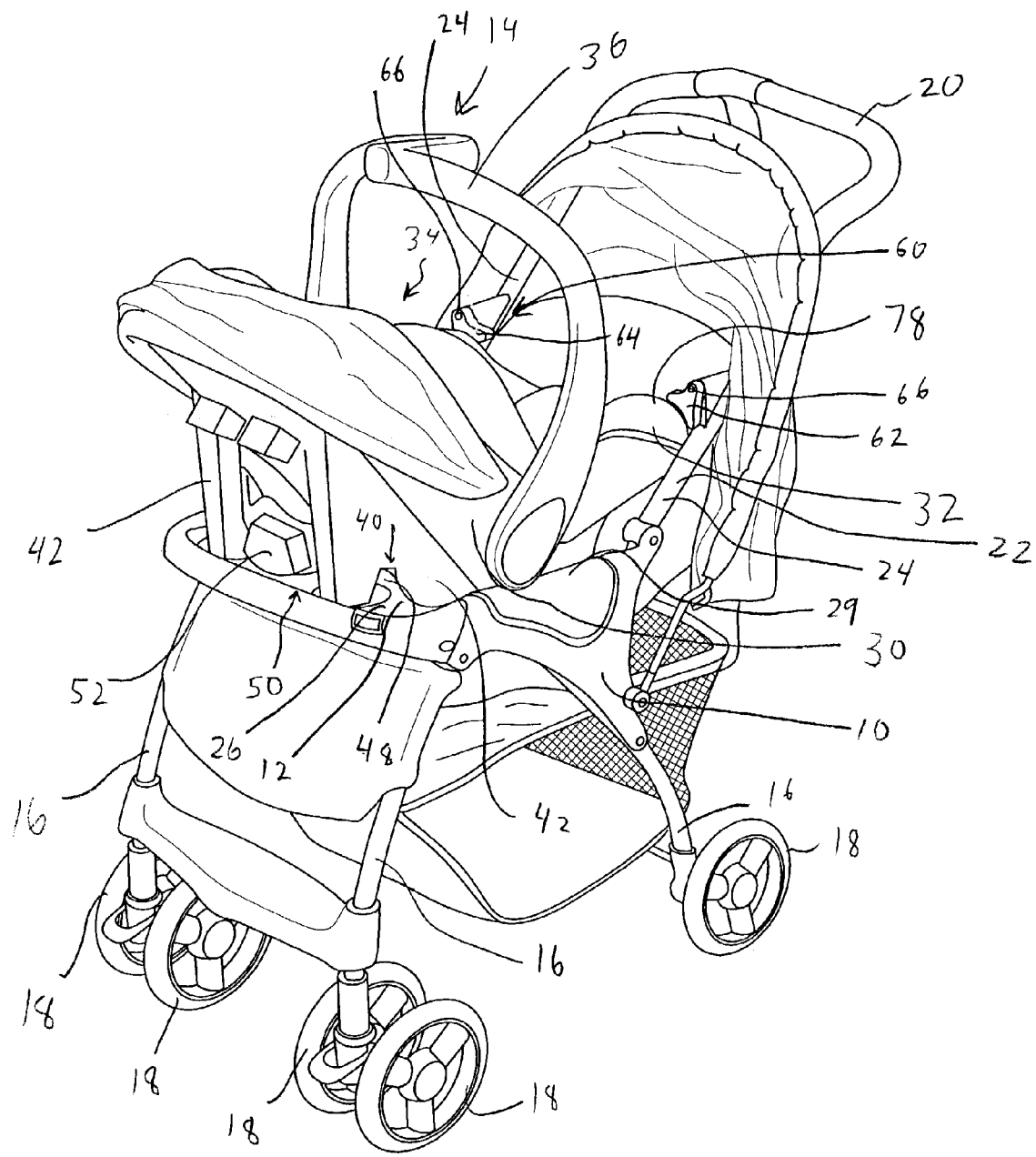
FIG. 2 is a front perspective view of the stroller and infant carrier of FIG. 1, with the infant carrier coupled to the stroller.

As shown in FIGS. 1 and 2, a stroller 10 may include a frame 12 shaped to releasably receive an infant carrier 14 thereon. Although the frame 12 may include various component of the body of the stroller 10, in one embodiment the frame 12 may include a tray 26 and portions of the arm rests 29 of the stroller 10. The stroller 10 may also include a set of generally downwardly-extending legs 16 with each leg 16 including at least one wheel 18 coupled to an end thereof. The stroller 10 may include a handlebar 20 that is shaped and located to be gripped by an operator such that the operator can roll the stroller 10 in the desired manner and direction.

The stroller 10 may also include a connecting structure 22 extending between the handlebar 20 and the frame 12. The connecting structure 22 may include a pair of generally parallel tubular members 24 extending generally upwardly and rearwardly from the frame 12, with each member 24 being coupled to opposite sides of the handlebar 20. Portions of the frame 12 may include or be located on or adjacent to lower portions of the tubular members 24. The stroller 10 may include a retaining bar 26, such as a tray or other structure, located across the front of the seating area 37 of the stroller 10 such that the retaining bar 26 is located in front of an occupant when the occupant is seated in the stroller 10. The tray 26 may be pivotable to a generally vertical position to allow a child to be located in the seating area 37.

Figure 8:
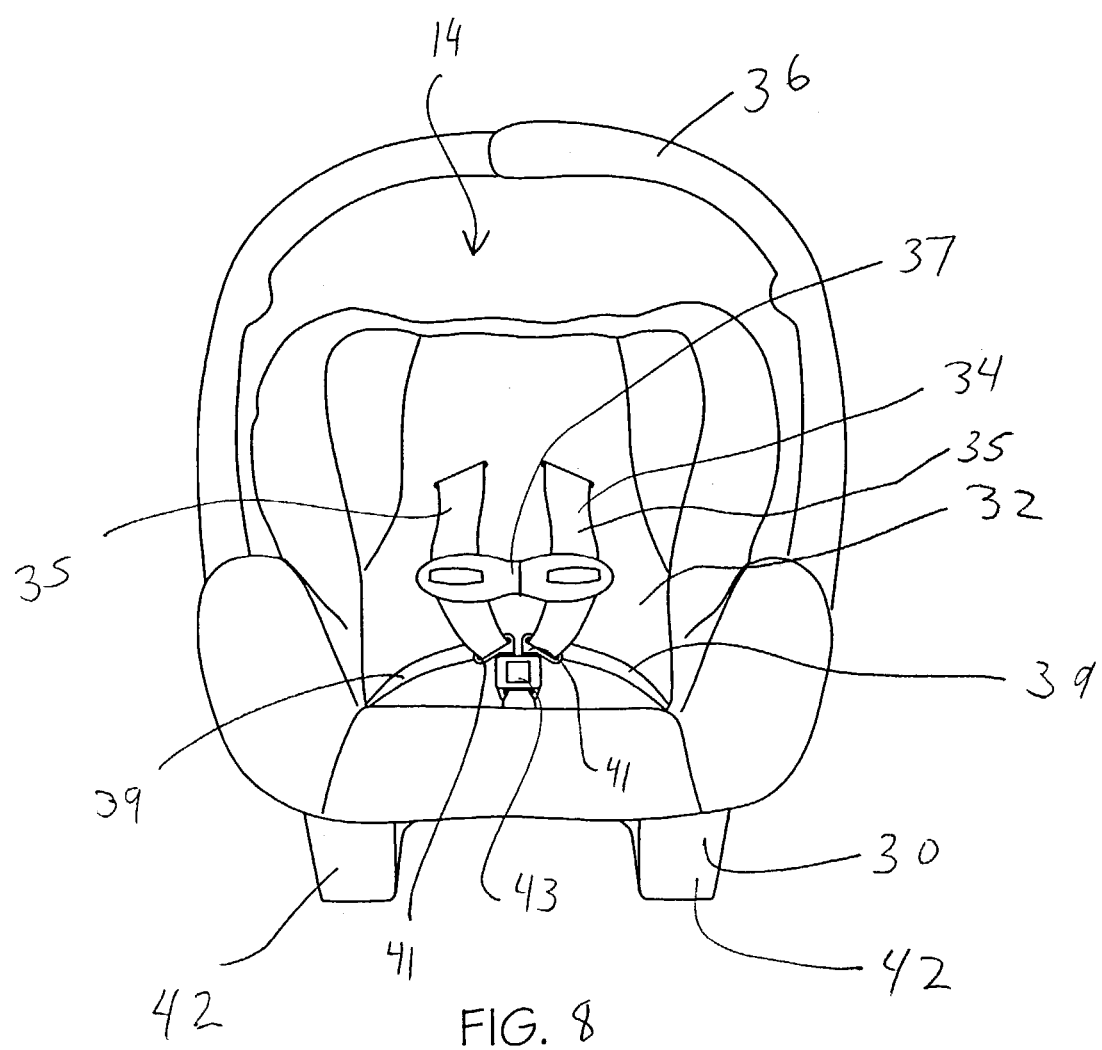
FIG. 8 is a perspective view of an infant carrier.

The infant carrier 14 may be a standard infant carrier of a type well known in the art and may include a generally rigid shell 30 with a soft, cushioned covering 32 located thereon. The infant carrier 14 may include a harness or set of straps 34 (FIG. 8), such as a 5-point harness or the like, located thereon to securely retain an occupant on or in the infant carrier 14. The harness 34 may include a set of shoulder harnesses 35 shaped and located to fit over the shoulder of an occupant, with a chest clip 37 releasably connecting the shoulder harnesses 35. The harness 34 may include a pair of lap belts 39 shaped and located to lie on the lap of an occupant. The harness 34 may also include a pair of tongue member 41, each tongue member being slidable along an associated belt 35, 37, and releasably coupled to a buckle 43. The infant carrier 14 may include a pivotable handle 36 such that an adult or operator can grip the handle 36 and carry the infant carrier 14 by the handle 36.

The infant carrier 14 may be shaped to be releasably coupled to the stroller 10. In particular, the infant carrier 14 may include a pair of spaced recesses 40, with each recess being located in the bottom edge of a support wall 42 (FIG. 1). Each recess 40 may be shaped to receive a protrusion 48 of the retaining bar 26 therein. The infant carrier 10 may include a locking mechanism, generally designated 50, that is movable between a locked position and an unlocked position. The locking mechanism 50 may be biased into its locked position and shaped and arranged such that when the retaining bar 26 is received in the recesses 40, the locking mechanism 50 engages or grips the retaining bar 26 to couple the infant carrier 14 to the retaining bar 26 and stroller 10. The locking mechanism 50 may be shaped such that the locking mechanism 50 automatically engages (i.e., moves to its locking or retaining position) the retaining bar 26 when the retaining bar 26 is received in the recesses 40. The locking mechanism 50 may include a retractable pin or protrusion that can be located below the retaining bar 26.

The infant carrier 14 may include an actuator 52 operatively coupled to the locking mechanism 50 such that the actuator 52 can be operated (such as by lifting the actuator 52 upwardly) to operate or release the locking mechanism 50. Once the locking mechanism 50 is released, the infant carrier 14 may be able to be lifted off of the frame 12 of the stroller 40.

Of course, the infant carrier 14 may be able to be coupled to and released from the stroller 10 or frame 12 in a wide variety of manners other than those described above and shown herein without departing from the scope of the invention. For example, the stroller 10 need not include the retaining bar 26 that is received in the recesses 40, and the stroller 10 may instead or in addition include various other locking mechanisms. Furthermore, the locking mechanism 50 may be located on the stroller 10 (i.e., such as on the retaining bar 26) or elsewhere on the frame 12.

The stroller 10 may include a retaining mechanism, generally designated 60, for retaining the infant carrier 14 on the frame 12 of the stroller 10. The retaining mechanism 60 may be located generally between the rear edge of frame 12 (indicated by axis C of FIG. 1) and the handlebar 20 (indicated by axis D). The retaining mechanism 60 may be directly or indirectly located on or extending from the connecting structure 22. The retaining mechanism 60 may be located generally rearwardly of the retaining bar 26, or generally rearwardly of the midpoint of the arm rests 29, or generally rearwardly of the rear edge of the frame (indicated by axis C).

Figure 3:
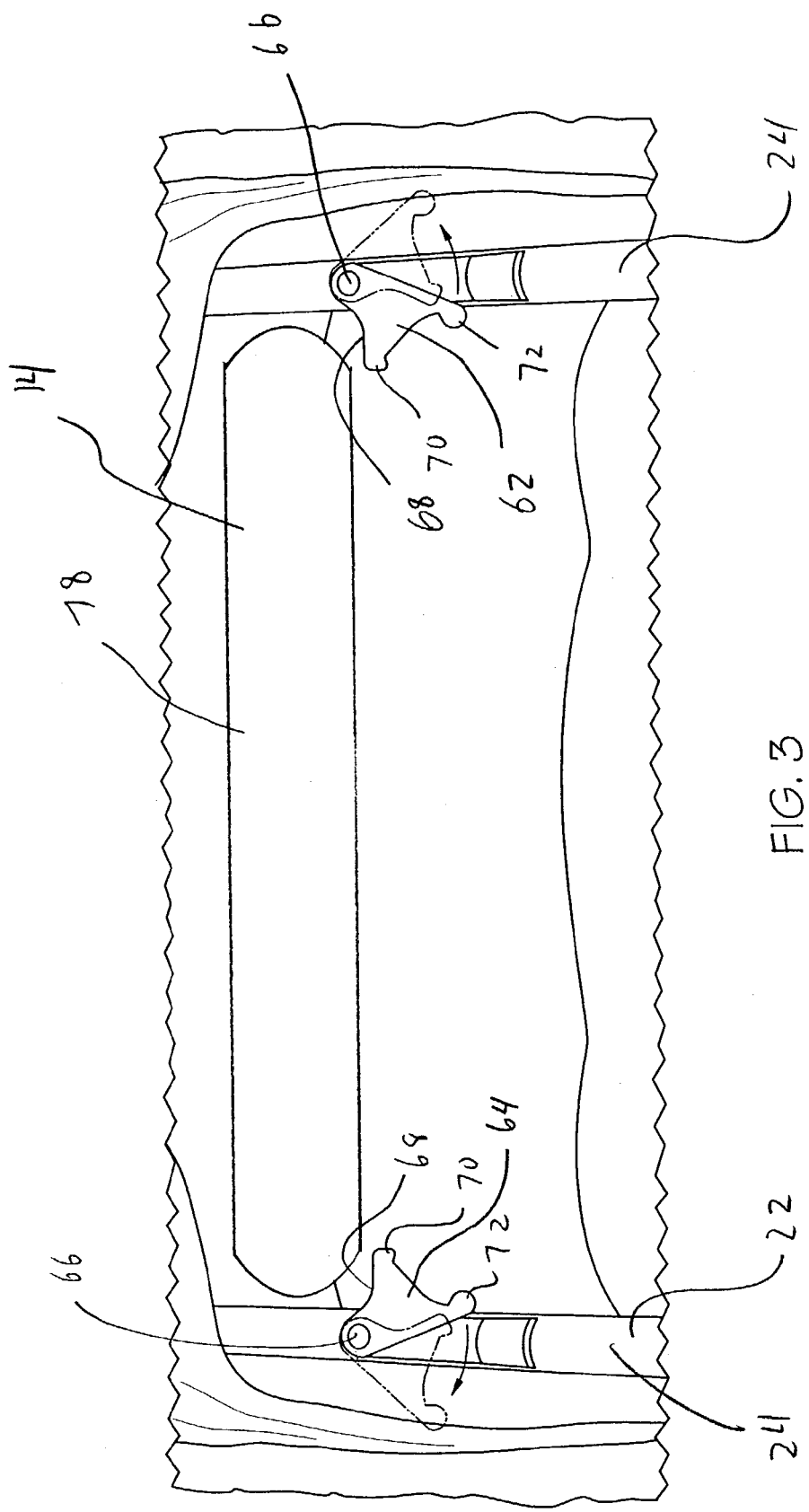
FIG. 3 is a front detail view of the stroller of FIG. 1 along line 3—3.

The retaining mechanism may include a pair of pivotable clips 62, 64, with each clip 62, 64 having a pivot point 66 and being located on one of the members 24. Each clip 62, 64 may be pivotable about an axis that is generally parallel to the forward motion of travel of the stroller 10. As best shown in FIG. 3, each clip 62, 66 may be generally triangular in front view, and may include an engagement surface 68 as an upper "side" of the triangle, and a pair of protrusions 70, 72 with each protrusion 70, 72 being located at a "tip" of the triangle. Each clip 62, 64 may be pivotable about pivot point 66 between a retaining position (shown in solid lines in FIG. 3) and a loading position (shown in hidden lines in FIG. 3). The clips 62, 64 may be biased into their retaining position by various means, such as by springs, gravity, various mechanical arrangements, etc.

In order to locate the infant carrier 14 on the frame 12 of the stroller 10, the infant carrier 14 is located above the frame, for example, such that the recesses 40 are aligned with the retaining bar 26 (FIG. 1). The infant carrier 14 is then lowered toward the frame 12. As shown in FIG. 3, when the infant carrier 14 is sufficiently lowered, the rear edge 78 (shown schematically in FIG. 3) of the infant carrier 14 is located immediately above the clips 62, 64. The clips 62, 64 are arranged such that when the clips 62, 64 are in the retaining position, the horizontal distance between the clips 62, 64 is less than the width of the rear edge 78 of the infant carrier 14. Thus, as the infant carrier 14 is lowered onto the frame, the rear edge 78 of the infant carrier 14 engages the engagement surfaces 68 of the locking clips 62, 64.

Figure 4:
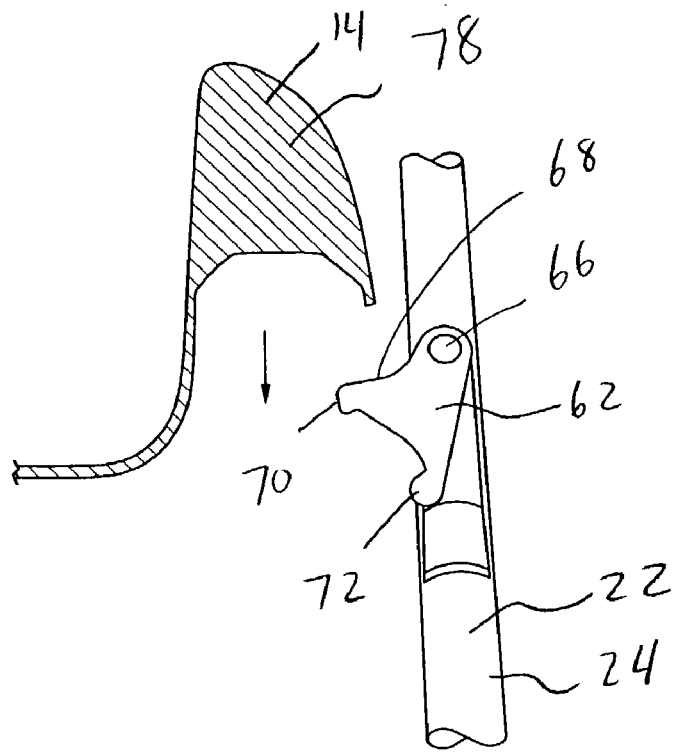
FIGS. 4–7 are a sequence of front views illustrating the sequence of operation for coupling the infant carrier to the supplemental restraining mechanism.

FIGS. 4–7 are a series of front views illustrating the remaining sequence of views of the clip 62 as the infant carrier 14 is lowered onto the frame 12. However, it should be understood that the movement and operation of clip 64 is substantially identical. FIG. 4 illustrates the infant carrier 14 located above the retaining mechanism 60 similar to the position shown in FIG. 3.

Figure 5:
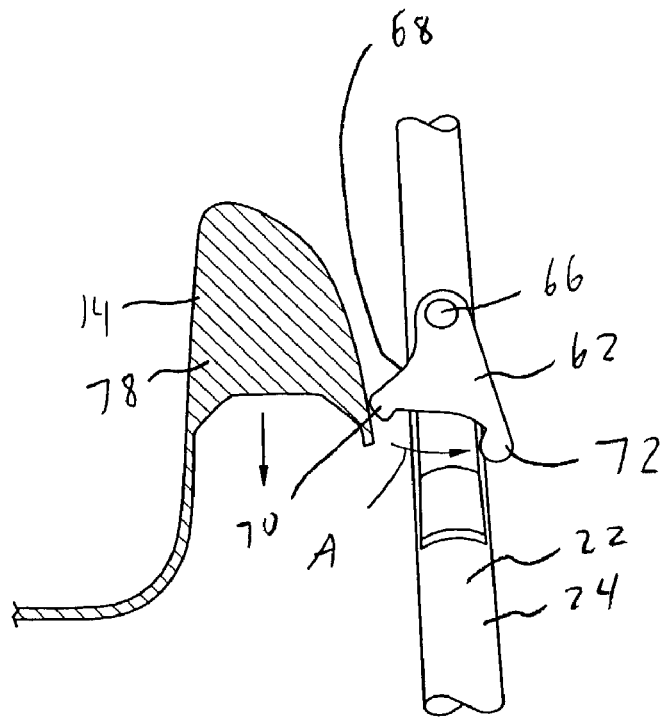
Figure 6:
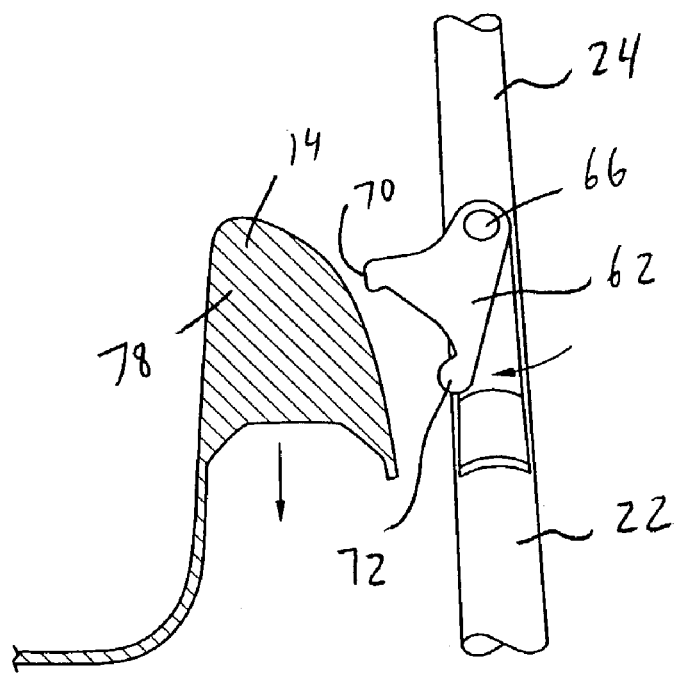

As the infant carrier 14 is lowered, the infant carrier 14 engages the engagement surfaces 68 and urges the clips 62, 64 to pivot outwardly about their pivot points 66 as indicated by arrow A (FIG. 5). FIG. 5 illustrates the configuration in which the clips 62, 64 and retaining mechanism 60 are in their loading position, in which the clips 62, 64 are sufficiently spaced apart to allow the rear edge 78 of the infant carrier 14 to pass between the clips 62, 64.

Figure 7:
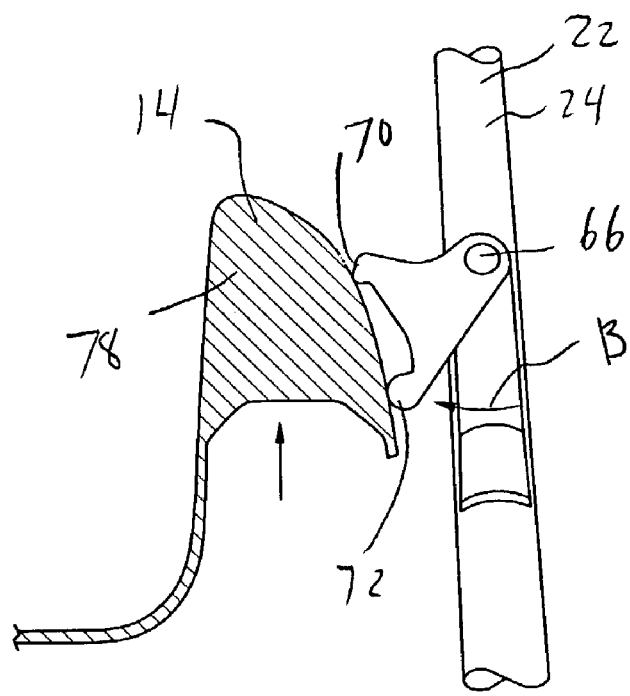

Once the rear edge 78 of the infant carrier 14 is lowered past the clips 62, 64, the clips 62, 64 return to their original, retaining position (FIG. 6), as urged by the biasing springs (not shown). Once the infant carrier 14 is located on the frame 12 (i.e., the retaining bar 26 is received in the recesses 40) and the clips 62, 64 return to their retaining position to prevent significant vertical motion of the rear edge 78 of the infant carrier 14. In particular, as shown in FIG. 7, if the infant carrier 14 is attempted to be raised, the rear edge 78 of the infant carrier 14 engages the protrusion 70 of the clips 62, 64 and causes each clip 62, 64 to pivot inwardly (i.e., in the direction of arrow B). As the clips 62, 64 rotate inwardly, the tips 72 of the clips 62, 64 engage and "squeeze" the infant carrier 14 between the clips 62, 64 to block any further vertical motion of the infant carrier. In other words, any attempt to lift the infant carrier 14 is translated into a generally outward force that is transmitted to the members 24 which resist such outward force.

In this manner, the retaining mechanism 60 can operate in conjunction with the locking mechanism 50 to secure the infant carrier 14 to the frame 12 or stroller 10. The retaining mechanism 60 can be spaced apart from the locking mechanism 50 to provide a supplemental locking or retaining mechanism. Furthermore, rather than "squeezing" the infant carrier 14, the infant carrier 14 may include a lip, bar, or other structure which engages the clips 62, 64 to block any rotation of the clips 62 to retain the infant carrier on the frame 12.

When it is desired to remove the infant carrier 14 from the stroller 10, the actuator 52 can be operated to release the locking mechanism 50, and the infant carrier 14 can be lifted slightly away from or above the retaining bar 26. The infant carrier 14 can then be slid forwardly (that is, away from the handlebar 20) to slide the infant carrier 14 forwardly and out from under the clips 62, 64. Once the infant carrier 14 is slid out from under the clips 62, 64, the infant carrier 14 is fully uncoupled from the stroller 10, and can be used as a carrier, or coupled to another carrier-receiving component.

Accordingly, the retaining mechanism 60 of the present invention may be configured such that locating the infant carrier 14 on the frame 12 causes the retaining mechanism 60 to move from the retaining position to the loading position, and back to the retaining mechanism, without requiring any additional actions or operations by the user. In particular, the simple act of lowering the infant carrier 14 onto the frame 12 can enable the retaining mechanism 60 to couple the infant carrier 14 to the stroller 10.

Furthermore, during the loading procedure, the retaining mechanism 60 may move from the retaining position, to the loading position, and back to the retaining position without any additional actions or operations by the user beyond lowering the infant carrier 14. Similarly, when it is desired to uncouple the infant carrier 14 from the stroller 10, the infant carrier 14 can be slid forwardly and out from under the retaining mechanism 60 without any additional actions or operations by the user. In this manner, the user may not be required to take any additional affirmative steps or actions in order to operate the retaining mechanism 60. Alternately, the retaining mechanism may be configured such that when the infant carrier 14 is lifted off of the frame 12, the infant carrier 14 engages the retaining mechanism 60 and causes it to move to the unloading/release position.

Having described the invention in detail and by reference to the preferred embodiments, it will be apparent that modifications and variations thereof are possible without departing from the scope of the invention.

The invention claimed is:

1. A transportation system comprising:
   a stroller including:
   a frame;
   a set of wheels coupled to said frame;
   a handlebar shaped and located to be gripped by an operator such that said operator can roll said stroller in the desired direction; and
   a retaining mechanism; and
   an infant carrier shaped to receive an infant therein, said infant carrier being shaped to be selectively mounted to said frame, said retaining mechanism being repositionable responsive to movement of said infant carrier between a retaining position and a loading position such that upward movement of said infant carrier is operative to engage said retaining mechanism and mount said infant carrier to said frame;
   wherein said retaining mechanism is biased into said retaining position;
   wherein said retaining mechanism is configured such that locating said infant carrier on said frame causes said retaining mechanism to move from said retaining position to said loading position as said infant carrier is located on said frame;
   wherein said retaining mechanism returns to said retaining position after said infant carrier is located on said frame; and
   wherein said infant carrier can be lifted off of said frame while said retaining mechanism is located in said retaining position without moving said retaining mechanism from said retaining position to said loading position.

2. The system of claim 1 wherein said retaining mechanism is configured such that locating said infant carrier on said frame causes said infant carrier to contact said retaining mechanism to cause said retaining mechanism to move to said retaining position.

3. The system of claim 1 further including a connecting structure extending between said handlebar and said frame, and wherein said retaining structure is located on or adjacent to said connecting structure.

4. The system of claim 3 wherein said connecting structure includes a pair of generally parallel members extending generally upwardly from said frame.

5. The system of claim 1 wherein said infant carrier includes a rear portion that is located adjacent to said retaining mechanism when said infant carrier is located on said frame, and wherein said retaining mechanism is shaped and located to block significant vertical movement of said rear portion of said infant carrier when said infant carrier is located on said frame and said retaining mechanism is in said retaining position.

6. The system of claim 5 wherein said retaining mechanism includes at least two pivotable clips, each clip being pivotable between a retaining position and a loading position and arranged such that the horizontal distance between each clip is greater when said clips are located in their loading positions than when said clips are located in their retaining positions.

7. The system of claim 6 wherein each clip can pivot from said retaining position to said loading position when said infant carrier is lowered onto said frame, and wherein each clip is generally blocked from pivoting from said retaining position to said loading position when said infant carrier is located on said frame.

8. The system of claim 7 wherein each clip is independently pivotable and is biased into the retaining position.

9. The system of claim 5 wherein said retaining mechanism includes at least one pivotable clip.

10. The system of claim 1 wherein when said retaining mechanism is in said loading position said infant carrier can be lowered onto said frame, and wherein when said retaining mechanism is in said retaining position and said infant carrier is located on said frame said retaining mechanism blocks significant vertical movement of at least a portion of said infant carrier.

11. The system of claim 1 further including a locking mechanism located at least partially on at least one of said stroller or said infant carrier for securing said infant carrier and said stroller together, said locking mechanism being spaced apart from said retaining mechanism.

12. The system of claim 1 wherein said retaining mechanism is configured such that locating said infant carrier on said frame causes said retaining mechanism to move to said retaining position.

13. The system of claim 1 wherein said frame includes a retaining bar located generally in front of a seating area of said stroller, and wherein said retaining mechanism is located generally rearwardly of said retaining bar.

14. The system of claim 1 wherein said retaining mechanism is located generally between a rear edge of said frame and said handlebar.

* * * * *